US009972982B2

(12) United States Patent
Jin et al.

(10) Patent No.: US 9,972,982 B2
(45) Date of Patent: May 15, 2018

(54) APPARATUS FOR RELIEVING TENSION OF ELECTRIC CABLE

(71) Applicant: Tai Han Electric Wire Co., Ltd., Gyeonggi-do (KR)

(72) Inventors: Jung Woon Jin, Gyeonggi-do (KR); Hoe Jeom Kim, Gyeonggi-do (KR); Dong Suk Hong, Gyeonggi-do (KR); Kyung Soo Choi, Gyeonggi-do (KR); Han Hwa Kim, Seoul (KR); Hwa Jong Kim, Gyeonggi-do (KR); Hyun Joo Kim, Gyeonggi-do (KR)

(73) Assignee: Tai Han Electric Wire Co., Ltd., Anyang-si, Gyeonggi-do (KR)

( * ) Notice: Subject to any disclaimer, the term of this patent is extended or adjusted under 35 U.S.C. 154(b) by 0 days. days.

(21) Appl. No.: 15/067,182

(22) Filed: Mar. 11, 2016

(65) Prior Publication Data

US 2017/0264089 A1 Sep. 14, 2017

(51) Int. Cl.
*H02G 3/04* (2006.01)
*F16L 3/10* (2006.01)
*F16L 3/18* (2006.01)

(52) U.S. Cl.
CPC .......... *H02G 3/0406* (2013.01); *F16L 3/1091* (2013.01); *F16L 3/18* (2013.01)

(58) Field of Classification Search
CPC ......... H02G 3/0406; F16L 3/1091; F16L 3/18
USPC .. 248/49, 51, 56, 58, 65, 70, 576, 578, 602, 248/624
See application file for complete search history.

(56) References Cited

U.S. PATENT DOCUMENTS

| | | | | |
|---|---|---|---|---|
| 1,495,287 A * | 5/1924 | Wilson | B60Q 1/0483 | 248/602 |
| 2,675,977 A * | 4/1954 | Von Berlichingen | F16L 3/2053 | 248/576 |
| 2,708,686 A * | 5/1955 | Bernard, Jr. | F16L 3/00 | 174/41 |
| 4,333,212 A * | 6/1982 | Bibollet | F16B 45/02 | 182/190 |
| 4,582,281 A * | 4/1986 | Van Camp | B25J 9/06 | 248/49 |
| 4,705,243 A * | 11/1987 | Hartmann | B23K 11/362 | 248/160 |

(Continued)

*Primary Examiner* — Daniel J Troy
*Assistant Examiner* — Guang H Guan
(74) *Attorney, Agent, or Firm* — Revolution IP, PLLC

(57) ABSTRACT

An apparatus for relieving tension of an electric cable includes an anchor plate; a bell mouth supporting the cable; a plurality of guide supporting bars directly connecting the anchor plate and the bell mouth; an elasticity controller through which each guide supporting bar is penetrated and inserted; a mobile supporting plate elastically supported by one end of the elasticity controller, the mobile supporting plate selectively pressurizing the elasticity controller according to the tension of the cable and moveable along a longitudinal direction of the plurality of guide supporting bars; a fixed supporting plate provided between the mobile supporting plate and the bell mouth, the fixed supporting plate being supported and fixed to each guide supporting bar, the other end of the elasticity controller being supported by the fixed supporting plate; and one or more spring cleats combined with the mobile supporting plate, the spring cleat adapted for holding and fixing the cable.

4 Claims, 5 Drawing Sheets

100 1 1000 300 500 600 400 700 200 10

511 711 730 750 710 740 L2 L1 510 521 520 720 770

(56) References Cited

U.S. PATENT DOCUMENTS

| | | | | |
|---|---|---|---|---|
| 5,974,960 | A * | 11/1999 | Weldin | H02G 3/0406 100/214 |
| 6,467,734 | B1 * | 10/2002 | Brown | E03C 1/021 248/65 |
| 6,547,191 | B2 * | 4/2003 | McDonald | E02B 3/20 248/49 |
| 7,049,507 | B2 * | 5/2006 | Sutehall | H02G 7/053 174/40 CC |
| 7,165,870 | B2 * | 1/2007 | McKenney | F16F 15/067 248/603 |
| 9,000,299 | B2 * | 4/2015 | Ruth | H02G 3/32 174/40 CC |
| 9,308,791 | B2 * | 4/2016 | Korson | F16L 3/205 |
| 2003/0106968 | A1 * | 6/2003 | Terrill | B25B 27/10 248/58 |
| 2009/0188203 | A1 * | 7/2009 | Fox | H02G 3/32 52/741.3 |
| 2017/0264089 | A1 * | 9/2017 | Jin | H02G 3/0406 |

* cited by examiner

APPARATUS FOR RELIEVING TENSION OF ELECTRIC CABLE

BACKGROUND

The present invention relates to an apparatus for relieving tension of an electric cable. More specifically, the present invention relates to an apparatus for relieving tension of an electric cable configured to prevent the slipping-down phenomenon of cables.

In general, electric cables may deviate from their originally fixed installation position due to deformation in tension caused by its own weight and heat during railway operation.

The routing of electric cables installed underground is largely classified into the horizontal region, inclined region and vertical region. In particular, there is a problem that the slipping-down phenomenon of cables occurs in the inclined region and vertical region. Here, the slipping-down phenomenon of cables refers to the phenomenon of cables slipping downwards.

For example, the slipping-down phenomenon of cables may occur in cables installed in the inclined region and vertical region by the weight of the cables themselves. Alternatively, the slipping-down phenomenon of cables may occur by linear expansion caused by temperature change in cables according to load change.

As such, the slipping-down phenomenon of cables has problems such as degrading electric performance by causing excessive bending and elongation of cables, and delivering excessive stress even to structures supporting cables.

SUMMARY

The technical task of the present invention, which is to solve the above problems, is to provide an apparatus for relieving tension of an electric cable configured to prevent the slipping-down phenomenon of cables.

In order to achieve the technical task, an embodiment of the present invention provides an apparatus for relieving tension of an electric cable, including an anchor plate installed in a wall; a bell mouth spaced apart from the anchor plate in a predetermined distance, the bell mouth supporting the cable; a plurality of guide supporting bars connecting the anchor plate and the bell mouth; a fixed supporting plate provided between the anchor plate and the bell mouth, the fixed supporting plate being supported and fixed to the guide supporting bar; an elasticity controller through which the guide supporting bar is penetrated and inserted, one end of the elasticity controller being supported by the fixed supporting plate; a mobile supporting plate elastically supported by the other end of the elasticity controller, the mobile supporting plate selectively pressurizing the elasticity controllers according to the tension of the cable and moving along the longitudinal direction of the guide supporting bar; and a spring cleat combined with the mobile supporting plate, the spring cleat holding and fixing the cable.

According to an embodiment of the present invention, the spring cleat may include an upper cleat holding an upper surface of the cable, the upper cleat formed with a spring receiving groove; a lower cleat configured in pairs with the upper cleat, the lower cleat holding a lower surface of the cable; a spring inserted and supported by the spring receiving groove, the spring pressurizing the cable; and a coupling part combining the upper cleat and the lower cleat in a state where the spring is pressurized.

According to an embodiment of the present invention, the mobile supporting plate includes an upper supporting plate combined with the upper cleat and formed with an upper guiding hole through which the guide supporting bar is penetrated and inserted; and a lower supporting plate combined with the lower cleat and formed with a lower guiding hole through which the guide supporting bar is penetrated and inserted, wherein the upper guiding hole has the form of a long hole where the length L1 is formed to be longer than the width L2.

According to an embodiment of the present invention, the guide supporting bar may include a first shaft combined with the anchor plate; a main shaft connected to the first shaft, the main shaft guiding movement of the elasticity controller; and a second shaft connected to the main shaft, one end of the second shaft supporting the fixed supporting plate, and the other end being combined with the bell mouth.

According to an embodiment of the present invention, a plurality of spring cleats are provided, and the plurality of spring cleats may be combined with a base plate and integrated therewith.

The effect of the apparatus for relieving tension of an electric cable according to the present invention explained in the above is as shown below.

According to the present invention, the elasticity controller is configured to be deformed by compression or elongation according to the thermal tension of cables, and is configured to prevent the slipping-down phenomenon of cables. That is, when the cable is extended by load change, the elasticity controller is compressed to prevent the cable from deviating from the pipe conduit within the wall. That is, the cable is configured to move only within a predetermined distance allowed.

In contrary, when the cable is contracted by load change, although the elasticity controller is elongated, the cable moving into the pipe conduit is limited by the spring cleat and mobile supporting plate. For example, when the cable is contracted by load blocking in a state where the elasticity controller is compressed by load increase, the elasticity controller is helpful in moving the cable to its initial position by the restoring force.

As such, the elasticity controller is configured to be deformed by compression or elongation according to the thermal tension of cables, and is configured to prevent the slipping-down phenomenon of cables. A plurality of elasticity controllers are provided in parallel, so as to disperse force with respect to the thermal tension of cables, effectively.

According to the present invention, the spring cleat is provided with springs, and is configured to maintain at least a predetermined surface pressure with respect to change in outer diameter of cable according to heat expansion. That is, when the outer diameter of the cable increases, the spring is configured to be compressed, and when the outer diameter of the spring decreases, the spring is configured to be elongated by restoring force.

As such, the spring cleat is configured to allow elastic deformation with respect to change in outer diameter of the cable, so that the cable can be strongly fixed to the spring cleat.

According to the present invention, a plurality of spring cleats are provided, and the plurality of spring cleats are configured to be combined with the base plate and integrated therewith. This spring cleat is configured individually, to facilitate the work of installing spring cleats in cables.

The effects of the present invention are not limited to the above-mentioned effects, and it should be understood that the effects of the present invention include all effects that can be inferred from the configuration of the invention described in the detailed description of the invention or the appended claims.

DETAILED DESCRIPTION

Figure 1:
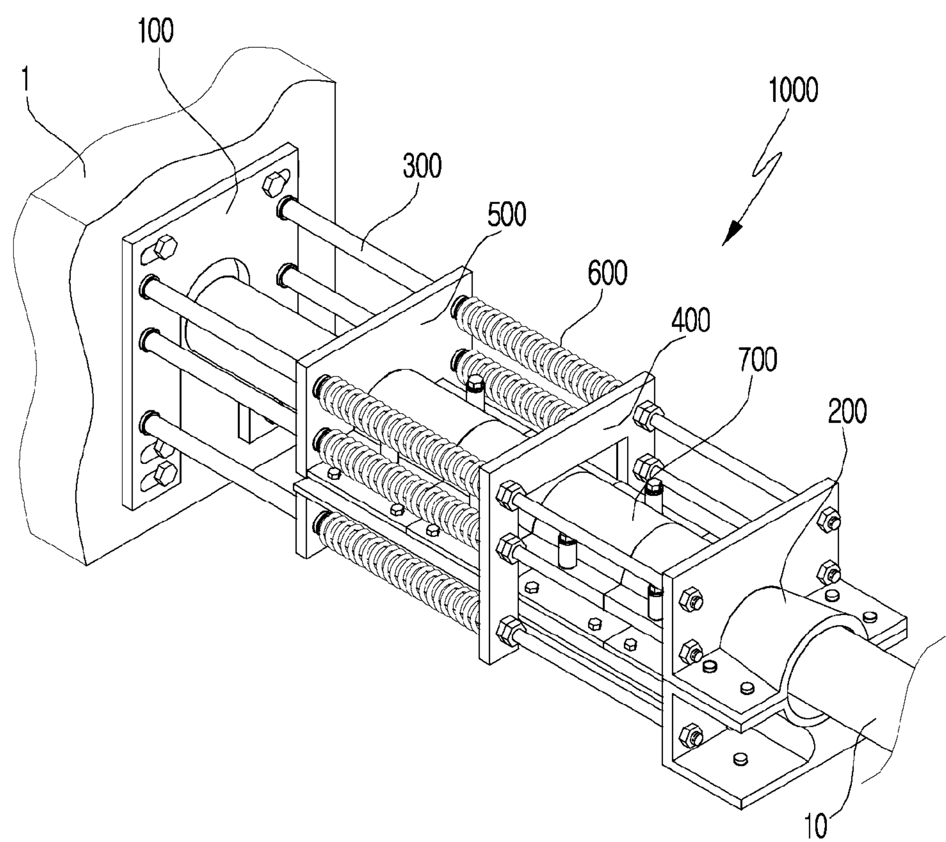
FIG. 1 is a perspective view of an apparatus for relieving tension of an electric cable according to an embodiment of the present invention.

Hereinafter, the present invention will be explained with reference to the accompanying drawings. The present invention, however, may be modified in various different ways, and should not be construed as limited to the embodiments set forth herein. Also, in order to clearly explain the present invention, portions that are not related to the present invention are omitted, and like reference numerals are used to refer to like elements throughout.

Throughout the specification, it will be understood that when an element is referred to as being "connected to" another element, it may be "directly connected to" the other element, or intervening elements or layers may be present. Also, it will also be understood that when a component "includes" an element, unless there is another opposite description thereto, it should be understood that the component does not exclude another element but may further include another element.

Hereinafter, examples of the present invention will be explained in more detail with reference to the accompanying drawings.

Figure 2:
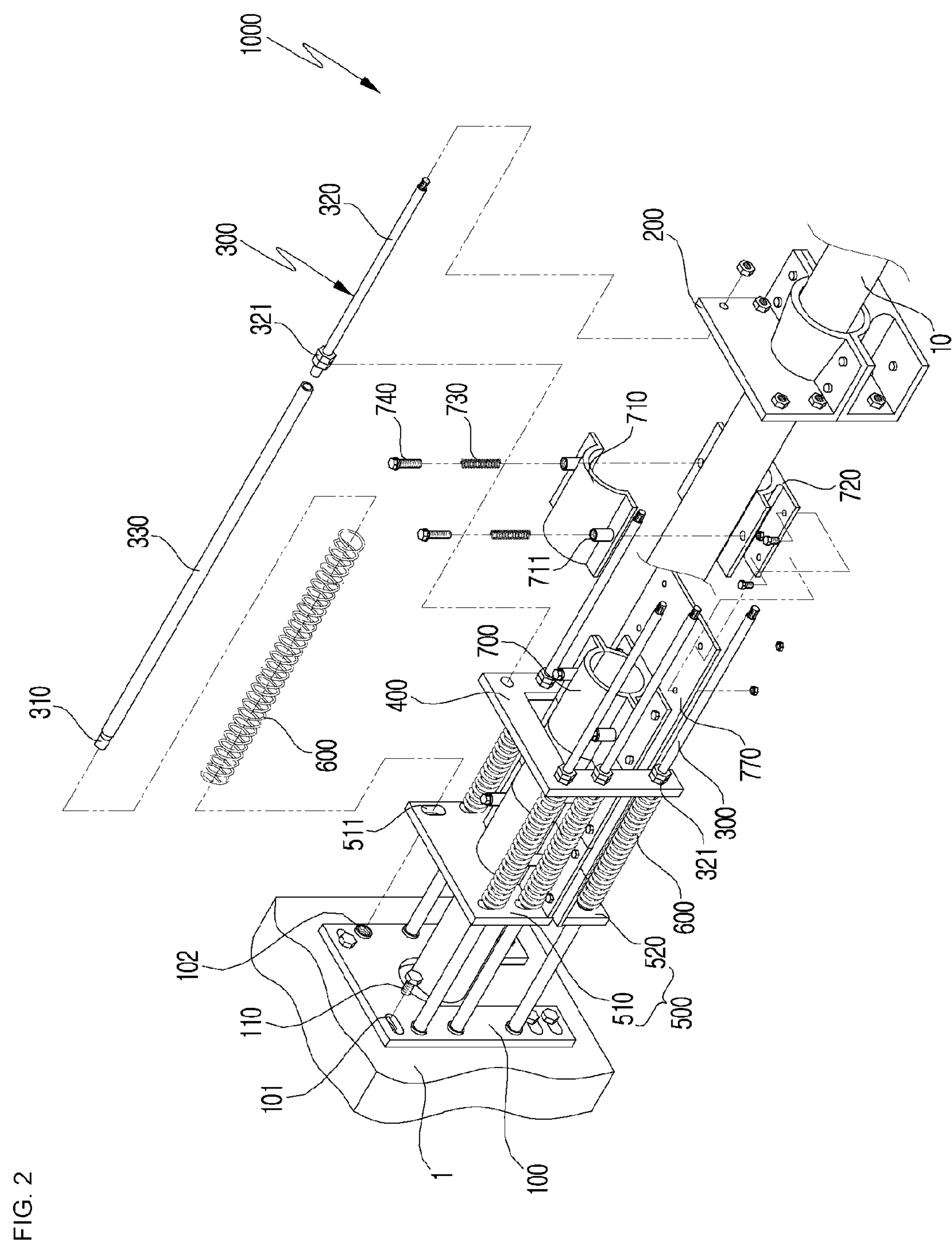
FIG. 2 is an exploded perspective view of an apparatus for relieving tension of an electric cable according to an embodiment of the present invention.
Figure 3:
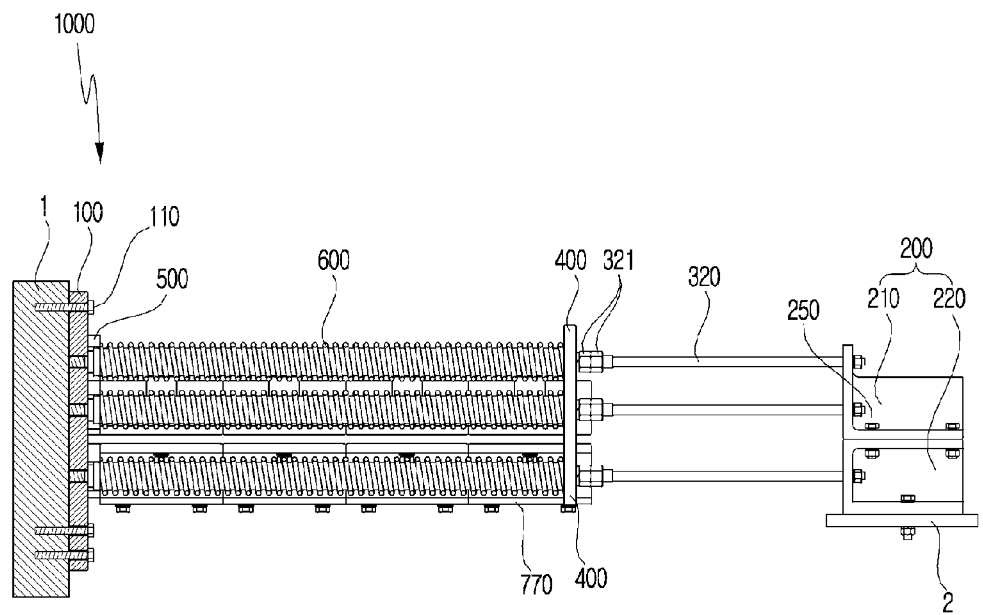
FIG. 3 is a front view of an apparatus for relieving tension of an electric cable according to an embodiment of the present invention.
Figure 4:
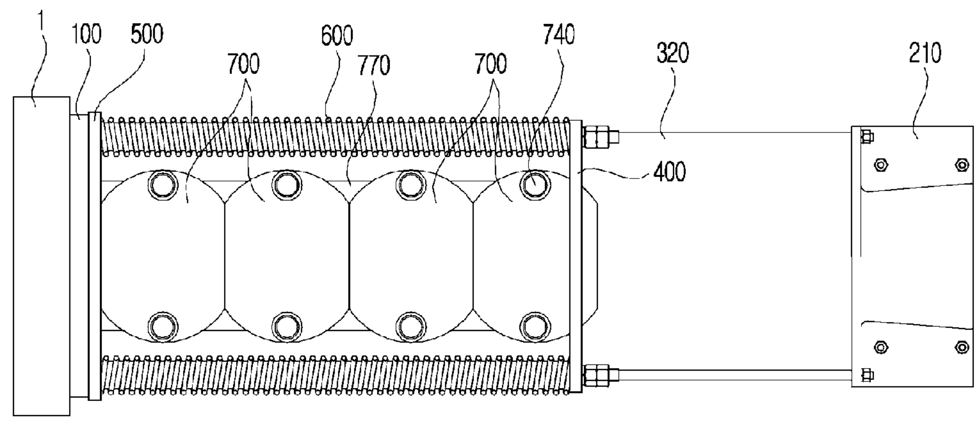
FIG. 4 is a plan view of an apparatus for relieving tension of an electric cable according to an embodiment of the present invention.

FIG. 1 is a perspective view of an apparatus for relieving tension of an electric cable according to an embodiment of the present invention. FIG. 2 is an exploded perspective view of an apparatus for relieving tension of an electric cable according to an embodiment of the present invention. FIG. 3 is a front view of an apparatus for relieving tension of an electric cable according to an embodiment of the present invention. FIG. 4 is a plan view of an apparatus for relieving tension of an electric cable according to an embodiment of the present invention.

As illustrated in FIG. 1 to FIG. 4, the apparatus 1000 for relieving tension of an electric cable may include an anchor plate 100, a bell mouth 200, a guide supporting bar 300, a fixed supporting plate 400, a mobile supporting plate 500, an elasticity controller 600, and a spring cleat 700.

The anchor plate 100 is installed and fixed to a wall 1. This anchor plate 100 is configured so that the apparatus 1000 for relieving tension of an electric cable is supported and fixed to the wall 1.

The anchor plate 100 is formed with a fixing hole 101, and a fixing member 110 such as an anchor bolt is penetrated and inserted into the fixing hole 101 to fix the anchor plate 100 to the wall 1.

The bell mouth 200 is configured to be spaced apart from the anchor plate 100 in a predetermined distance. In this case, the distance between the bell mouth 200 and the anchor plate 100 is configured to correspond to the length of the guide supporting bar 300.

The bell mouth 200 is formed with a cable guiding hole 201 (see FIG. 6), and a cable 10 is penetrated and inserted into the cable guiding hole 201 so that the cable 10 may be supported by the bell mouth 200.

This bell mouth 200 is configured to be combined with the guild supporting bar 300 combined with the anchor plate 100. Also, the bell mouth 200 is configured to be supported and fixed to a hanger 2, so that the bell mouth 200 can be strongly fixed even in thermal tension of the cable 10.

The guide supporting bar 300 is configured to connect the anchor plate 100 and the bell mouth 200. That is, one end of the guide supporting bar 300 is configured to be combined with the anchor plate 100, and the other end of the guide supporting bar 300 is configured to be combined with the bell mouth 200. Thus, the supporting force of the anchor plate 100 fixed to the wall 1 may be delivered to the bell mouth 200.

A plurality of guide supporting bars 300 are provided to strongly support the bell mouth 200. In an embodiment, there is explained an example where there are six guide supporting bars 300. However, the number of guide supporting bars 300 is not necessarily limited to six, and it is obvious that there may be various numbers of guide supporting bars.

As such, the guide supporting bar 300 is combined with the anchor plate 100, so as to be configured to support the fixed supporting plate 400, mobile supporting plate 500 and bell mouth 200, while guiding the moving direction of the mobile supporting plate 500.

This guide supporting bar 300 may include a first shaft 310, a second shaft 320, and a main shaft 330.

One end of the first shaft 310 is configured to be combined with a supporting combining hole 102 formed in the anchor plate 100. One end of the main shaft 330 is configured to be connected to the first shaft 310.

This main shaft 330 is configured to be penetrated and inserted into an elasticity controller 600, and the outer diameter of the main shaft 330 is configured to correspond to the inner diameter of the elasticity controller 600. That is, the main shaft 330 is configured to guide the moving direction of the elasticity controller 600 when pressurizing or elongating the elasticity controller 600.

The second shaft 320 is configured to be connected to the other end of the main shaft 330. The other end of the second shaft 320 is configured to be combined with the bell mouth 200, and one end of the second shaft 320 is configured to support the fixed supporting plate 400.

Meanwhile, the fixed supporting plate 400 is provided between the anchor plate 100 and the bell mouth 200.

This fixed supporting plate 400 is supported and fixed to the guide supporting bar 300. Here, the fixed supporting plate 400 may be supported and fixed to the guide supporting bar 300 by a fixed supporting member 321 provided at the second shaft 320.

As such, the fixed supporting plate 400 is configured to support one end of the elasticity controller 600 selectively pressurized by the mobile supporting plate 500.

The elasticity controller 600 is configured to have the guide supporting bar 300 penetrated and inserted therethrough. This elasticity controller 600 is provided between the fixed supporting plate 400 and the mobile supporting plate 500. That is, one end of the elasticity controller 600 is supported by the fixed supporting plate 400, and the other end of the elasticity controller 600 is supported by the mobile supporting plate 500.

This elasticity controller 600 is configured to be selectively pressurized according to the thermal tension of the cable 10. Here, the elasticity controller 600 has the guide supporting bar 300 penetrated and inserted therethrough, so that the deviation of the elasticity controller 600 is prevented, in pressurizing the elasticity controller 600.

As such, a plurality of elasticity controllers 600 may be provided symmetrically on the left and right side with respect to the cross-section of the apparatus 1000 for relieving tension of an electrical cable. Thus, the force delivered from the cable 10 may be smoothly dispersed to the elasticity controller 600. That is, the plurality of elasticity controllers 600 are configured to smoothly disperse force delivered from the thermal tension of the cable 10, thereby preventing the slipping-down phenomenon of cables 10.

Of course, the elasticity controller 600 may be further provided at the upper part and lower part with respect to the cross-section of the apparatus 1000 for relieving tension of an electrical cable. As such, the number of elasticity controllers 600 is not limited to a specific number.

Meanwhile, the mobile supporting plate 500 may be configured to selectively pressurize the elasticity controller 600 according to the tension of the cable 10.

This mobile supporting plate 500 may include an upper supporting plate 510 and a lower supporting plate 520. The upper supporting plate 510 is configured to be combined with an upper cleat 710, and the lower supporting plate 520 is configured to be combined with a lower cleat 720.

Here, the spring cleat 700 having the upper cleat 710 and the lower cleat 720 is a feature moving together according to the tension of the cable 10. Also, the mobile supporting plate 500 combined with the spring cleat 700 is a feature moving together with the spring cleat 700.

In other words, the spring cleat 700 moves together with the cable 10 according to the tension of the cable 10, and the mobile supporting plate 500 combined with the spring cleat 700 also moves together with the cable 10.

For example, when the length of the cable 10 is extended by load change, the mobile supporting plate 500 pressurizes the elasticity controller 600 and grows apart from the anchor plate 100. On the other hand, when the length of the cable 10 is contracted by load change, the mobile supporting plate 500 moves toward the anchor plate 100 by the elastic restoring force of the elasticity controller 600.

As such, the apparatus 1000 for relieving tension of an electric cable allows the elasticity controller 600 to be deformed by compression or elongation according to the thermal tension of the cable 10, and prevents the slipping-down phenomenon of the cable 10.

This mobile supporting plate 500 selectively moves along the longitudinal direction of the guide supporting bar 300 according to the tension of the cable 10.

Here, the mobile supporting plate 500 is formed with guide holes 511 and 521 inserted with a guide supporting bar 300, and thus the mobile supporting plate 500 may selectively move along the guide supporting bar 300. That is, the upper supporting plate 510 is formed with the upper guide hole 511, and the lower supporting plate 520 is formed with the lower guide hole 521 (see FIG. 5).

In this case, the upper guide hole 511 has the form of a long hole where the length L1 is longer than the width L2. This is to take action against change when the outer diameter of the cable 10 changes according to heat expansion of the cable 10.

For example, when the outer diameter of the cable 10 increases due to heat expansion of the cable 10, the upper cleat 710 moves upward, and the upper supporting plate 510 combined with the upper cleat 710 also moves upward. Here, since the upper guide hole 511 has the form of a long hole, the upper cleat 710 can move up and down even in a state having the guide supporting bar 300 inserted therein.

Meanwhile, the spring cleat 700 is configured to hold and fix the cable 10. The configuration of the spring cleat 700 will be explained in detail with reference to FIG. 5.

Figure 5:
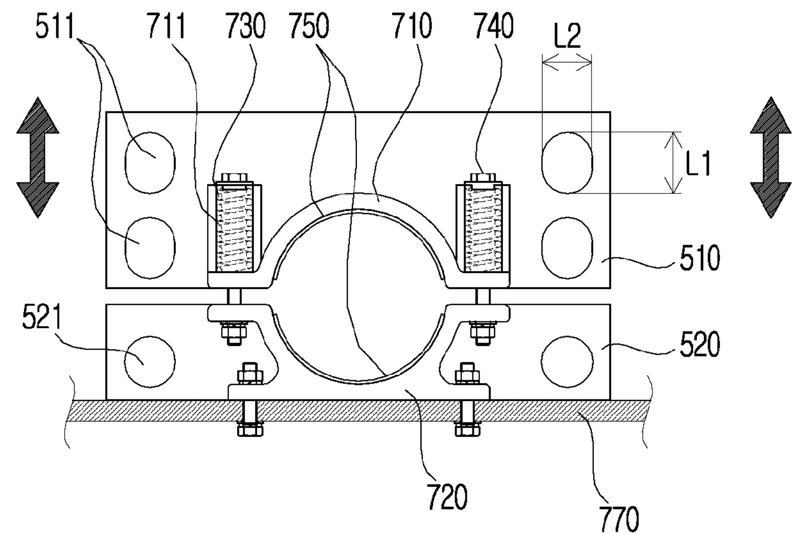
FIG. 5 is an exemplary view illustrating a spring cleat according to an embodiment of the present invention.

FIG. 5 is an exemplary view illustrating a spring cleat according to an embodiment of the present invention.

Referring to FIG. 5, the spring cleat 700 may include an upper cleat 710, a lower cleat 720, a spring 730, and a coupling part 740.

The upper cleat 710 is configured to hold the upper surface of the cable 10 and support the cable 10.

The upper cleat 710 is formed with a spring receiving groove 711, and the spring 730 is configured to be inserted in the inner side of the spring receiving groove 711.

The lower cleat 720 is configured in pairs with the upper cleat 710, and is configured to hold the lower surface of the cable 10.

As such, the upper cleat 710 and lower cleat 720 enclose the cable 10 to be fixed to the cable 10.

Here, the inner side of the upper cleat 710 and the lower cleat 720 is provided with a pad part 750, so as to increase adhesion with the cable 10. Of course, this pad part 750 may be made of a rubber material that may prevent cables from slipping down.

The spring 730 is configured to pressurize the cable 10 in a state inserted in the spring receiving groove 711. That is, the spring 730 is provided with at least a predetermined surface pressure for the spring cleat 700 to hold and fix the cable 10 with respect to change in outer diameter of the cable 10 in a state where the lower end of the spring 730 is supported by the spring receiving groove 711, and the upper end of the spring 730 is supported by the head part of the coupling part 740.

For example, when the outer diameter of the cable 10 increases, the spring 730 is compressed and the upper cleat 710 may move upward along the coupling part 740. On the other hand, when the outer diameter of the cable 10 decreases, the spring 730 is restored and the upper cleat 710 may move downward along the coupling part 740. As such, the spring 730 is compressed or elongated with respect to change in outer diameter of the cable 10, and the spring cleat 700 provides at least a predetermined surface pressure to hold and press the cable 10.

The coupling part 740 combines the upper cleat 710 with the lower cleat 720. This coupling part 740 may consist of a bolt and a nut, and may combine the upper cleat 710 with the lower cleat 720 in a state where the spring 730 is pressurized. In this case, of course, the coupling part 740 may selectively control the pressurized state of the spring 730 according to the clamping of the bolt.

As such, a plurality of spring cleats 700 may be provided, and the plurality of spring cleats 700 may be combined with a base plate 770 and integrated therewith. This spring cleat

700 may be configured individually, to facilitate the work of installing spring cleats 700 in cables 10.

For example, when preparing a mold of one spring cleat having the same size as a form where four pieces of spring cleats 700 are combined, the weight of the spring cleat increases, and thus there is a difficulty in fixedly installing the spring cleat in the cable 10. Thus, preferably, the spring cleat 700 is made individually.

Figure 6:
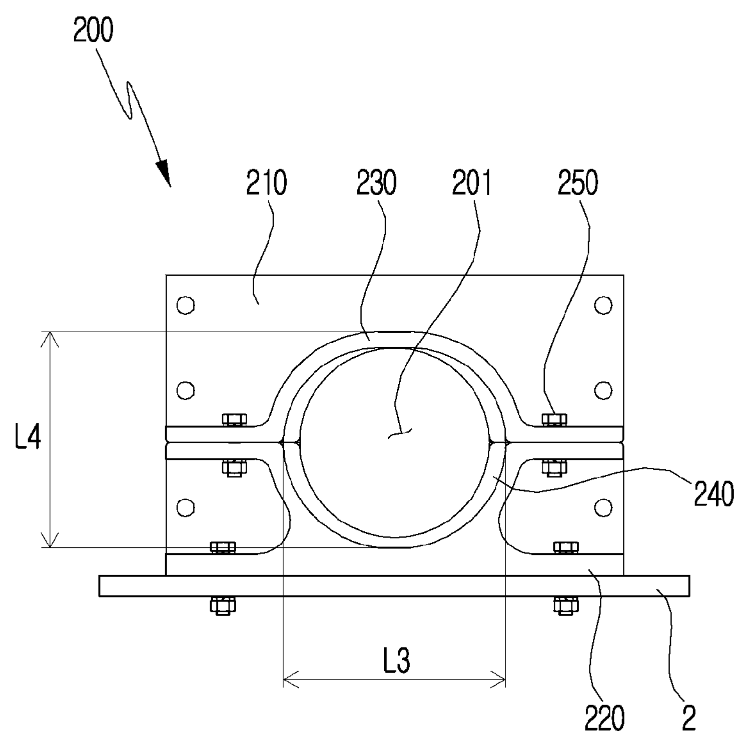
FIG. 6 is an exemplary view illustrating a bell mouth according to an embodiment of the present invention.

FIG. 6 is an exemplary view illustrating a bell mouth according to an embodiment of the present invention.

Referring to FIG. 6, the bell mouth 200 may include an upper body 210, a lower body 220, an upper protrusion 230 and a lower protrusion 240.

The upper body 210 and lower body 220 may be combined with locking members 250 such as bolts and nuts. This upper body 210 and lower body 220 are configured to be combined with the other end of the second shaft 320. Also, the lower body 220 may be combined with a hanger 2 to strongly fix the bell mouth 200 even in thermal tension of the cable 10.

The upper protrusion 230 is protrudedly formed from the upper body 210, and protrudedly formed from the lower protrusion 240. The upper protrusion 230 and lower protrusion 240 have shapes corresponding to each other, and form a cable guiding hole 201 through the combination.

Here, the upper protrusion 230 and lower protrusion 240 are configured to protrude in an expanded form. That is, the upper protrusion 230 is protruded in a form expanded from the upper body 210, and the lower protrusion 240 is protruded in a form expanded from the lower body 220.

In this case, the cable guiding hole 201 formed in the bell mouth 200 has the form of a long hole where the width L3 is longer than the length L4. Thus, the cable 10 may be easily penetrated and inserted into the expanded cable guiding hole 201.

Also, as the width L3 of the cable guiding hole 201 is configured to be longer than the length L4, when thermal tension of the cable 10 occurs, left and right movement is possible within a predetermined range, in a state where up and down movement of the cable 10 is limited. Accordingly, when thermal tension of cable 10 occurs, this prevents force from being delivered to the bell mouth 200 excessively.

Of course, this bell mouth 200 may be formed integrally, not being separated into the upper body 210 and lower body 220.

Figure 7:
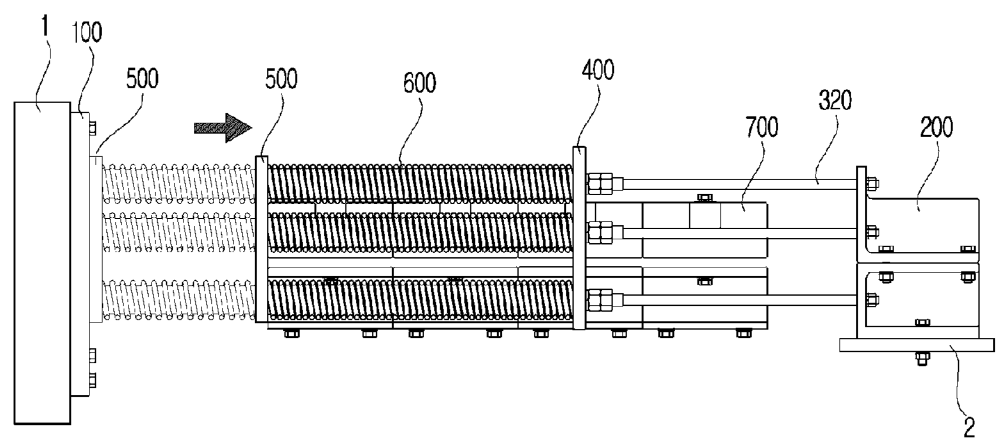
FIG. 7 is an exemplary view illustrating the apparatus for relieving tension of an electric cable in an extended state according to an embodiment of the present invention.
Figure 8:
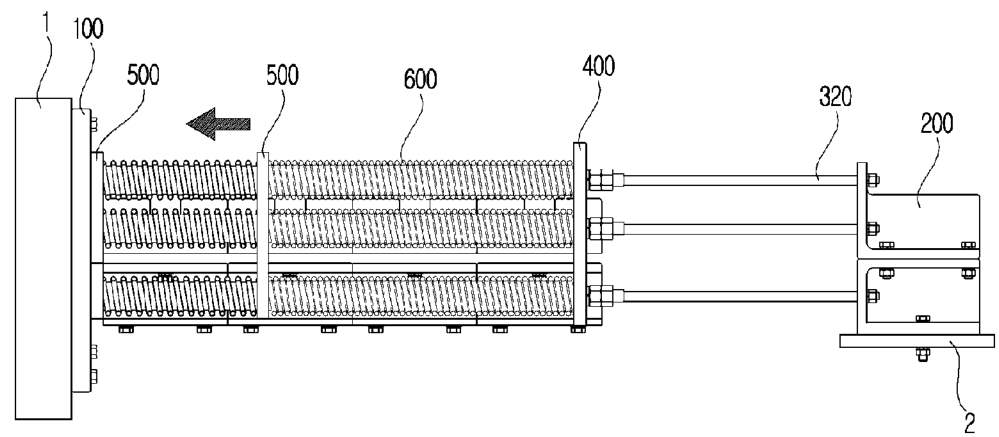
FIG. 8 is an exemplary view illustrating the apparatus for relieving tension of an electric cable in a contracted state according to an embodiment of the present invention.

FIG. 7 is an exemplary view illustrating the apparatus for relieving tension of an electric cable in an extended state according to an embodiment of the present invention. FIG. 8 is an exemplary view illustrating the apparatus for relieving tension of an electric cable in a contracted state according to an embodiment of the present invention.

As illustrated in FIG. 7 and FIG. 8, the apparatus 1000 for relieving tension of an electric cable is configured so that the mobile supporting plate 500 moves along the guide supporting bar 300 according to the tension of the cable 10 in correspondence to the change in cable 10 length.

Referring to FIG. 7, when the length of the cable 10 is extended by load change, the mobile supporting plate 500 pressurizes the elasticity controller 600 and moves towards the bell mouth 200. That is, the spring cleat 700 combined with the mobile supporting plate 500 moves towards the bell mouth 200 together with the mobile supporting plate 500. In other words, the cable 10 supported and fixed to the spring cleat 700 moves towards the bell mouth 200.

On the other hand, referring to FIG. 8, when the length of the cable 10 is contracted by load change, the mobile supporting plate 500 moves towards the wall 1 by the restoring force of the elasticity controller 600. That is, the spring cleat 700 combined with the mobile supporting plate 500 moves towards the wall 1 together with the mobile supporting plate 500. In other words, the cable 10 supported and fixed to the spring cleat 700 moves towards the wall 1.

As such, the apparatus 1000 for relieving tension of an electric cable allows the elasticity controller 600 to be deformed by compression or elongation selectively according to the thermal tension of the cable 10, and prevents the slipping-down phenomenon of the cable 10.

The cable 10 applied to the apparatus 1000 for relieving tension of an electric cable is not limited to a specific cable. Of course, the apparatus may be applied to various cables, for example, the cable 10 may be a single phase cable, or a three-phase cable.

Also, of course, general cleats, not spring cleats 700 with a spring may be used in the apparatus 1000 for relieving tension of an electric cable.

These are merely preferable embodiments of the present invention, and the scope of the present invention should not be limited by the scope described in the embodiments.

Although the exemplary embodiments of the present disclosure have been disclosed for illustrative purposes, those skilled in the art will appreciate that various modifications, additions and substitutions are possible, without departing from the scope and spirit of the present disclosure as disclosed in the accompanying claims. Therefore, it should be understood that the forgoing description is by way of example only, and is not intended to limit the present disclosure. For example, each constituent explained in singular form may be carried out being dispersed, and likewise, constituents explained as being dispersed may be carried out in combined forms.

The scope of the present invention is defined by the following claims, and it is intended that the present invention covers the modifications or variations of the present invention provided they come within the scope of the appended claims and their equivalents.

What is claimed is:

1. An apparatus for relieving tension of an electric cable, comprising:
  - an anchor plate adapted to be installed on a wall;
  - a bell mouth spaced apart from the anchor plate in a predetermined distance, the bell mouth adapted for supporting the electric cable;
  - a plurality of guide supporting bars directly connecting the anchor plate and the bell mouth;
  - a plurality of elasticity controllers, wherein each of the plurality of guide supporting bars penetrates and is inserted through a respective one of the plurality of elasticity controllers;
  - a mobile supporting plate elastically supported by a first end of each of the elasticity controllers, the mobile supporting plate configured to selectively pressurize the plurality of elasticity controllers according to the tension of the electric cable and moveable along a longitudinal direction of the plurality of guide supporting bars;
  - a fixed supporting plate provided between the mobile supporting plate and the bell mouth, the fixed supporting plate being supported and fixed to each guide supporting bar,
  - wherein a second end of each of the plurality of elasticity controllers is supported by the fixed supporting plate; and
  - one or more spring cleats combined with the mobile supporting plate, the one or more spring cleats adapted for holding and fixing the electric cable, wherein each of the one or more spring cleats comprises:

an upper cleat adapted for holding an upper surface of the electric cable, the upper cleat formed with a spring receiving groove;

a lower cleat configured in a pair with the upper cleat, the lower cleat adapted for holding a lower surface of the electric cable;

a spring inserted and supported by the spring receiving groove, the spring adapted for pressurizing the electric cable; and a coupling part combining the upper cleat and the lower cleat in a state where the spring is pressurized.

2. The apparatus of claim 1, wherein the mobile supporting plate comprises:

an upper supporting plate combined with the upper cleat of one of the one or more spring cleats and formed with upper guiding holes, each of the upper guiding holes being penetrated by a respective one of the plurality of guide supporting bars; and a lower supporting plate combined with the lower cleat of the one of the one or more spring cleats and formed with lower guiding holes, each of the lower guiding holes being penetrated by a respective one of the plurality of guide supporting bars, wherein each of the upper guiding holes has a length and a width where the width is shorter than the length.

3. The apparatus of claim 1, wherein each guide supporting bar comprises:

a first shaft combined with the anchor plate;

a main shaft connected to the first shaft, the main shaft configured to guide movement of a respective one of the plurality of elasticity controllers; and a second shaft connected to the main shaft, a first end of the second shaft supporting the fixed supporting plate, and a second end being combined with the bell mouth.

4. The apparatus of claim 1, wherein the one or more spring cleats includes a plurality of spring cleats, the plurality of spring cleats being combined with a base plate and integrated therewith.

* * * * *